(12) United States Patent
Hahn et al.

(10) Patent No.: US 9,563,382 B2
(45) Date of Patent: Feb. 7, 2017

(54) METHODS, SYSTEMS, AND COMPUTER READABLE MEDIA FOR PROVIDING FLEXIBLE HOST MEMORY BUFFER

(71) Applicant: SanDisk Technologies Inc., Plano, TX (US)

(72) Inventors: Judah Gamliel Hahn, Ofra (IL); Eran Erez, Bothell, WA (US); Sebastien Andre Jean, Boise, ID (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/814,460

(22) Filed: Jul. 30, 2015

(65) Prior Publication Data

US 2016/0026406 A1    Jan. 28, 2016

Related U.S. Application Data

(63) Continuation-in-part of application No. 14/297,563, filed on Jun. 5, 2014.

(51) Int. Cl.
*G06F 3/06* (2006.01)
*G06F 12/02* (2006.01)
*G06F 12/08* (2016.01)

(52) U.S. Cl.
CPC ............ *G06F 3/0631* (2013.01); *G06F 3/0608* (2013.01); *G06F 3/0656* (2013.01); *G06F 3/0685* (2013.01); *G06F 12/0246* (2013.01); *G06F 12/0802* (2013.01); *G06F 12/0871* (2013.01); *G06F 12/0873* (2013.01); *G06F* (Continued)

(58) Field of Classification Search
CPC .............. G06F 12/0246; G06F 12/0871; G06F 12/0873; G06F 12/0897; G06F 2212/1021; G06F 2212/1041; G06F 2212/205; G06F 2212/221; G06F 2212/283; G06F 2212/313; G06F 2212/608
USPC ................................................. 711/103, 122
See application file for complete search history.

(56) References Cited

U.S. PATENT DOCUMENTS 7,743,038 B1    6/2010  Goldick
7,937,393 B2    5/2011  Prahlad et al.
(Continued)

OTHER PUBLICATIONS

Non-Final Office Action for U.S. Appl. No. 14/297,563 (Dec. 4, 2015).

(Continued)

*Primary Examiner* — Gary Portka
(74) *Attorney, Agent, or Firm* — Jenkins, Wilson, Taylor & Hunt, P.A.

(57) ABSTRACT

Methods, systems, and computer readable media for providing a flexible host memory buffer are disclosed. One method includes allocating an amount of host memory as a host memory buffer accessible by a solid state drive (SSD) as a cache for SSD data. The method further includes caching data from the solid state drive in the host memory buffer. The method further includes monitoring utilization of the host memory buffer. The method further includes dynamically increasing or decreasing the amount of host memory allocated for the host memory buffer based on the utilization.

21 Claims, 5 Drawing Sheets

(52) U.S. Cl.
CPC ......... 2212/1016 (2013.01); *G06F 2212/1021*
(2013.01); *G06F 2212/1041* (2013.01); *G06F*
*2212/1044* (2013.01); *G06F 2212/205*
(2013.01); *G06F 2212/221* (2013.01); *G06F*
*2212/283* (2013.01);
*G06F 2212/311* (2013.01); *G06F 2212/313*
(2013.01); *G06F 2212/466* (2013.01); *G06F*
*2212/601* (2013.01); *G06F 2212/608*
(2013.01); *G06F 2212/7201* (2013.01)

(56) References Cited

U.S. PATENT DOCUMENTS

| | | | |
|---|---|---|---|
| 8,775,741 | B1 | 7/2014 | de la Iglesia |
| 2003/0188184 | A1 | 10/2003 | Strongin et al. |
| 2006/0106984 | A1 | 5/2006 | Bartley et al. |
| 2008/0320211 | A1 | 12/2008 | Kinoshita |
| 2009/0031083 | A1 | 1/2009 | Willis et al. |
| 2009/0228875 | A1 | 9/2009 | DeVries |
| 2010/0262721 | A1 | 10/2010 | Asnaashari et al. |
| 2011/0296088 | A1 | 12/2011 | Duzly et al. |
| 2011/0320685 | A1 | 12/2011 | Gorobets et al. |
| 2012/0051137 | A1 | 3/2012 | Hung et al. |
| 2012/0144092 | A1* | 6/2012 | Hsieh .................. G06F 12/023 711/103 |
| 2012/0284587 | A1 | 11/2012 | Yu et al. |
| 2012/0317335 | A1 | 12/2012 | Cho |
| 2013/0080732 | A1 | 3/2013 | Nellans et al. |
| 2013/0086311 | A1 | 4/2013 | Huang et al. |
| 2013/0138867 | A1 | 5/2013 | Craft et al. |
| 2013/0262533 | A1 | 10/2013 | Mitra et al. |
| 2013/0275672 | A1 | 10/2013 | Bert |
| 2013/0297852 | A1 | 11/2013 | Fai et al. |
| 2014/0149641 | A1 | 5/2014 | Avila et al. |
| 2014/0289492 | A1 | 9/2014 | Ranjith Reddy et al. |
| 2014/0337560 | A1 | 11/2014 | Chun et al. |
| 2015/0199269 | A1 | 7/2015 | Bert et al. |
| 2015/0356020 | A1 | 12/2015 | Desai et al. |
| 2016/0054931 | A1 | 2/2016 | Romanovsky et al. |
| 2016/0054934 | A1 | 2/2016 | Hahn et al. |
| 2016/0246726 | A1 | 8/2016 | Hahn |

OTHER PUBLICATIONS

"NVM Express," Specification Revision 1.2, http://nvmexpress.org/wp-content/uploads/NVM_Express_1_2_Gold_20141209.pdf, pp. 1-205 (Nov. 3, 2014).

Commonly-assigned, co-pending U.S. Appl. No. 14/297,563 for "Methods, Systems, and Computer Readable Media for Solid State Drive Caching Across a Host Bus," (Unpublished, filed Jun. 5, 2014).

"NVM Express Overview," NVM Express, pp. 1-2 (copyright 2013).

"Understanding the Flash Translation Layer (FTL) Specification," AP-684 Application Note, Intel, pp. 1-20 (Dec. 1998).

Commonly-assigned, co-pending U.S. Appl. No. 14/977,559 for "Methods, Systems, and Computer Readable Media for Automatically and Selectively Enabling Burst Mode Operation in a Storage Device" (Unpublshed, filed Dec. 21, 2015).

Non-Final Office Action for U.S. Appl. No. 14/464,584 (Dec. 4, 2015).

Commonly-assigned, co-pending U.S. Appl. No. 14/555,548 for "Storage Devices and Methods for Optimizing Use of Storage Devices Based on Storage Device Parsing of File System Metadata in Host Write Operations," (Unpublished, filed Nov. 26, 2014).

"Ext4 Disk Layout," https://ext4.wiki.kernel.org/index.php/Ext4_Disk_Layout, Wikipedia, pp. 1-28 (Nov. 17, 2014).

"CreateFile function," Microsoft, Windows Dev Center, https://msdn.microsoft.com/en-us/library/windows/desktop/aa363858(v=vs. 85).aspx, pp. 1-20 (2008).

"I/O Limits: block sizes, alignment and I/O hints," Red Hat, http://people.redhat.com/msnitzer/docs/io-limits.txt, pp. 1-4 (Jan. 14, 2013).

Notice of Allowance and Fees Due for U.S. Appl. No. 14/297,563 (Jul. 25, 2016).

Non-Final Office Action for U.S. Appl. No. 14/555,548 (Jul. 5, 2016).

"NVM Express," Specification Revision 1.2.1, http://www.nvmexpress.org/wp-content/uploads/NVM_Express_1_2_1_Gold_20160603.pdf, pp. 1-217 (Jun. 5, 2016).

Final Office Action for U.S. Appl. No. 14/464,584 (Apr. 26, 2016).
Final Office Action for U.S. Appl. No. 14/297,563 (Apr. 13, 2016).
Prabhakaran et al., "Analysis and Evolution of Journaling File Systems," 2005 USENIX Annual Technical Conference, pp. 105-120 (2005).

* cited by examiner

METHODS, SYSTEMS, AND COMPUTER READABLE MEDIA FOR PROVIDING FLEXIBLE HOST MEMORY BUFFER

PRIORITY CLAIM

This application is a continuation-in-part of U.S. patent application Ser. No. 14/297,563 filed Jun. 5, 2014, the disclosure of which is incorporated herein by reference in its entirety.

TECHNICAL FIELD

The subject matter described herein relates to methods and systems for operating solid state drives. More particularly, the subject matter described herein relates to methods, systems, and computer readable media for providing a flexible host memory buffer.

BACKGROUND

Solid state drives, or SSDs, are mass storage devices that use flash memory for bulk memory storage rather than the rotating magnetic disks used in traditional hard disk drives (HDDs) and are typically intended as a drop-in replacement for HDDs, meaning that the SSD is pin- and protocol-compatible with the HDD that it replaces. SSDs typically have faster access time and use less power than a comparable HDD, but usually cost substantially more than a comparable HDD. It is expected that SSDs will widely replace HDDs as the cost of SSDs continues to go down.

SSDs typically include a cache memory for temporarily storing data being read from or written to the SSD. Conventional SSD designs use SRAM for the level one (L1) cache, NAND or NOR flash memory for the level two (L2) cache, and NAND flash memory for the mass data storage (also called "bulk data storage" or "bulk storage".) SDRAM is also used to store a flash transition list's (FTL's) metadata. The L1 cache can be part of SRAM, which can be on chip. The L1 cache can also be part of DRAM, which can be part of the storage device address space and solely addressable by the storage device. Though SRAM or DRAM improves the performance, neither technology is favorable to a low end/low cost SSD, as using SRAM or DRAM increases die size, cost of materials and power consumption.

There are disadvantages associated with these conventional SSD designs, however. Although the SRAM used for the L1 cache is fast, the memory density of SRAM is quite low compared to flash memory, and so the memory capacity of the L1 cache is relatively small. It is possible to increase the L1 cache capacity by increasing the amount of SRAM on the SSD, but this leads to increased die size and cost. As SSDs become commodity items, it is important to keep the size of the silicon die down, and so increasing the amount of SRAM on the SSD (referred to as "on-board SRAM") is disfavored.

The flash memory typically used for the L2 cache has a high memory density relative to the die size, also has disadvantages. NOR flash is true random access memory, but has a lower memory density relative to NAND flash. NAND flash has a higher memory density relative to NOR flash, but must be accessed a page at a time, which necessitates the use of additional hardware, called the flash translation layer, or FTL, to make it appear as if the NAND flash supports true random access.

The use of an NAND flash for the L2 cache, however, imposes additional costs and constraints. Because flash is erasable only in large chunks, called pages—a common page size is 4096 bytes—modifying a single byte or word of NAND flash in actuality requires modification of an entire page at a time. Since flash memories degrade over time proportional to the number of program/erase cycles performed, the illusion of random access provided by the FTL has the undesired side effect of reducing the operating life flash memory.

Thus, the use of on-board flash as cache memory is less desirable than the use of RAM, and the use of SRAM as cache memory is limited by the physical size constraints of the on-board SRAM memory that would be required. Therefore, what is desired is an SSD that provides the advantages of a large RAM cache but without the disadvantages of either on-board flash or on-board SRAM. In addition, it is desirable to have an SSD architecture that can be configured for use for either high-end (high cost, high performance) and low-end (low cost, low power consumption) markets.

Accordingly, in light of these disadvantages associated with conventional SSD architectures, solid state drive caching across a host bus is desirable. When performing solid state drive caching across a host bus, a portion of host DRAM is used to cache data, such as FTL tables, for the SSD. Allowing host DRAM to be used as a cache by the SSD makes SSD operations more efficient and reduces the requirement for on-board DRAM in the SSD. However, if host DRAM is being used by the SSD, that portion of the DRAM is not available to the host and may adversely impact the performance of the host. The portion of host DRAM used for caching SSD data is referred to interchangeably herein as the host cache or host memory buffer. Because the host memory buffer is a shared resource between the SSD and the host, there exists a need for allocating the appropriate amount of DRAM for the host memory buffer that balances the needs of the SSD and the host and does not adversely affect the user experience. Accordingly, there exists a need for methods, systems, and computer readable media for providing a flexible host memory buffer.

SUMMARY

Methods, systems, and computer readable media for providing a flexible host memory buffer are disclosed. One method includes allocating an amount of host memory as a host memory buffer accessible by a solid state drive (SSD) as a cache for SSD data. The method further includes caching data from the solid state drive in the host memory buffer. The method further includes monitoring utilization of the host memory buffer. The method further includes dynamically increasing or decreasing the amount of host memory allocated for the host memory buffer based on the utilization.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for solid state drive caching across a host bus and flexible host memory buffer allocation are provided. Reference will now be made in detail to exemplary embodiments of the present invention, examples of which are illustrated in the accompanying drawings. Wherever possible, the same reference numbers will be used throughout the drawings to refer to the same or like parts.

In order to meet the needs of both high-end markets, such as desktop personal computers and servers, and low-end markets, such as laptops, tablets, and smartphones, the subject matter described herein includes an SSD architecture that can perform caching across a host bus, i.e., an SSD device that can store some of its cache in the host memory rather than on the SSD device. By reversing the normal direction of cache operations—the host caches data for the SSD rather than the SSD caching data for the host as is conventionally done—the SSD device can have a cache as large as it needs, limited only by the amount of RAM present and available on the host. However, as will be described in more detail below, the size of the cache or host memory buffer may be managed to balance host and SSD needs. This technique allows a single SSD architecture to be used for both low-end markets which do not require much cache area and instead value low power consumption and high-end markets for which large caches provide performance benefits.

Figure 1:
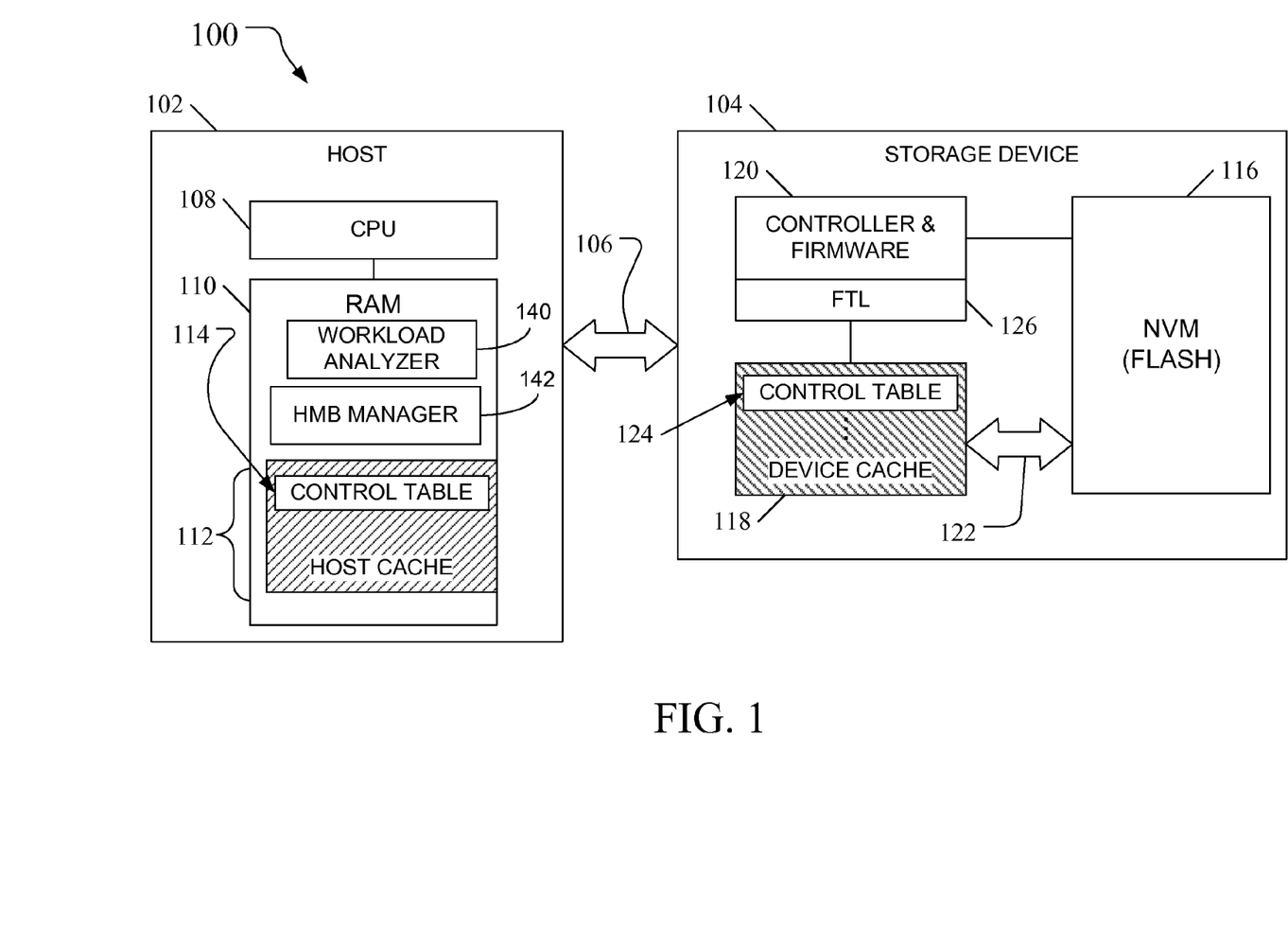
FIG. 1 is a block diagram showing an exemplary system for solid state drive caching across a host bus according to an embodiment of the subject matter described herein.

FIG. 1 is a block diagram showing a system for solid state drive caching across a host bus according to an embodiment of the subject matter described herein. In the embodiment illustrated in FIG. 1, system 100 includes a host 102 that is connected to as storage device 104 via a host bus 106.

Host 102 may be a personal computer, for example, or other device to which a storage device may be attached. In one embodiment, host 102 includes a CPU 108 or other processor hardware and random access memory (RAM) 110. In the embodiment illustrated in FIG. 1, a portion of RAM 110 has been set aside as a host cache 112 for use by device 104 to store one or more control tables 114, the purpose of which will be explained in more detail below.

Device 104 may be a solid state drive or other mass storage device that includes non-volatile memory. In the embodiment illustrated in FIG. 1, device 104 includes non-volatile memory (NVM) 116 such as flash for mass storage, a device cache 118, which may be SRAM, for example, and a controller 120 or other processor. In one embodiment, controller 120 may include or have access to local firmware for controlling the operation of device 104. In one embodiment, a local bus 122 connects NVM 116 and device cache 118.

In the embodiment illustrated in FIG. 1, device 104 uses device cache 118 to store metadata related to the configuration, operation, and/or contents of device 104. In one embodiment, device 104 may store metadata in the form of control tables 124 that reside within NVM 116 and that are loaded into device cache 118 via local bus 122 when faster access time is required. Examples of device 104 metadata that may be stored in a control table 124, include, but are not limited to, configuration data that is loaded at boot time from NVM 116 and never modified, control tables for flash management that are always backed up, and garbage collection data for which the sources are available on NVM 116. In one embodiment, control tables 124 are used by a flash translation layer FTL 126.

There is a direct correlation between the size of cache 118 and the performance efficiency of device 104: the larger the size of cache 118, the more control tables 124 may be stored there, and the less often metadata must be swapped between NVM 116 and cache 118. A device with a small cache 118 is not suitable for high-performance applications. A device with a large cache 118 is not suitable for the low-power applications, however.

The subject matter described herein addresses the issue of available cache space on an SSD by formulating a method that allows caching across the host bus. In the embodiment illustrated in FIG. 1, for example, device 104 retrieves metadata from NVM 116 and stores that metadata, possibly in the form of a control table 124, in cache 118. When cache 118 becomes full, if more metadata is needed, as in the case of a high-end application, for example, rather than moving some metadata from cache 118 back into NVM 116, device 104 will transfer that metadata from cache 118 into host buffer 112 via host bus 106. In this manner, host cache 112 becomes an extension of device cache 118, providing overflow space as needed for high-performance applications of device 104. Thus, a host collaborates with a device to maximize efficiency by allowing the device to cache some of the device metadata across the host bus, thus reducing the need for expensive metadata accesses from non-volatile storage.

This approach has several advantages. If the bandwidth across local bus 122 is less than the bandwidth across host bus 106 (which is often the case with high-speed host buses), this scheme balances host and flash bandwidth and thus less flash activity and error correction and less overall power consumption are required. Controller and product cost is reduced. By not requiring DRAM, power consumption of device 104 is reduced. By using a small device cache 118, such as one suitable for low-end applications, and using host cache 112 for additional space as may be required for high-end applications, the overall die size and product cost is further reduced. The same design may thus be used for both low-end and high-end markets, which reduces development cost. There is no need to change FTL design to address bigger page sizes, which might induce write amplification and therefore endurance issues as well as increase time to market. Even if the bandwidth across local bus 122 is not less than the bandwidth across host bus 106, the use of host cache 112 can still reduce the number of access times into NVM 116 and thus improve endurance times of NVM 116.

As stated above, it is desirable to manage the size of host cache 112, also referred to herein as the host memory buffer, in a manner that balances the needs of storage device 104 and host 102 and that does not adversely affect the overall performance of host 102. To manage the size of host cache 112, a workload analyzer 140 located on host 102 analyzes the current workload on host cache 112. For example, if the current accesses to host cache 112 are random I/O intensive, the accesses may be swaps of FTL tables between storage device 104 and host cache 112, meaning that the size of host cache or memory buffer 112 needs to be increased, providing more storage for the FTL tables. If on the other hand workload analyzer 140 determines that the current workload on host cache 112 is not random I/O intensive, i.e., the I/O is primarily sequential, workload analyzer 140 may then determine whether the workload is CPU intensive. An example of a CPU intensive workload may be a read to cache 112 followed by a number of processing cycles that do not involve reads to host cache 112. If the CPU is reading data from host cache 112 and not frequently accessing host cache 112, then it may be desirable to decrease the size of host cache 112 to allow RAM 110 to be used by other applications executing on CPU 108 that do not involve storage device 104. If the current access is not random I/O intensive and not CPU intensive, it may be desirable to maintain host cache 112 at its current size, as increasing or decreasing the size of host cache 112 will require swaps to and from storage device memory, which may reduce the lifetime of storage device 104. Thus, workload analyzer 140 analyzes the current workload on CPU 108 and/or host cache 112. HMB manager 142 increases and decreases the size of host cache 112 based on input from workload analyzer 140. An exemplary host cache memory allocation/deallocation process will be described in further detail below.

Conceptually, the techniques described herein can be thought of as providing a multiple-layer cache architecture, where device cache 118 operates as the L1 cache, host cache 112 operates as the L2, and NVM 116 operates as the L3 cache.

In one embodiment, device 104 may be configured to move only certain kinds of metadata into host cache 112. For example, device 104 may use host cache 112 to store data that, if lost, would not compromise the integrity of user data or that device 104 should be able to reconstruct. This protects the operation of device 104 even if the connection to host cache 112 is severed, such as may happen if host 102 and device 104 become physically disconnected from each other (e.g., when device 104 is unplugged from host 102) or logically disconnected from each other (e.g., if host 102 is shutdown or reset.) Thus, in the event of power failure or a loss of connectivity between host 102 and device 104, the data integrity is not compromised; device 104 continues to function by reading tables from NVM 116 into its local RAM cache 118 (L1) as required and writing back least recently used tables back to NVM 116.

In one embodiment, device 104 may include software and/or firmware that includes a front-end that is the interface between commands sent by host 102 and FTL 126. FTL 126 may use information stored in control table 124 to translate host accesses into NVM 116 accesses. In conventional systems in which both the FTL and the metadata used by the FTL are on the same storage device, the amount of metadata stored is limited by the size of the local cache. The metadata can be quite large—typically about $\frac{1}{1000}$th the size of the bulk flash memory. Putting both the FTL and the metadata used by the FTL on the host is possible. If the FTL and associated metadata are stored on the host, the FTL must store information relating to flash geometry, number of channels, number of free blocks, number of bad blocks, etc. In one embodiment, the mapping table may be stored in the host DRAM, rather than in SRAM on the device.

It should be noted that NVM 116 on storage device 104 can be implemented using any suitable memory technology. For example, NVM 116 may be implemented using 2D or 3D NAND flash memory or any combination of 2D and 3D flash memory. In one exemplary implementation, NVM 116 may be implemented using BiCS 3D NAND flash memory available from SanDisk Corporation.

Figure 2:
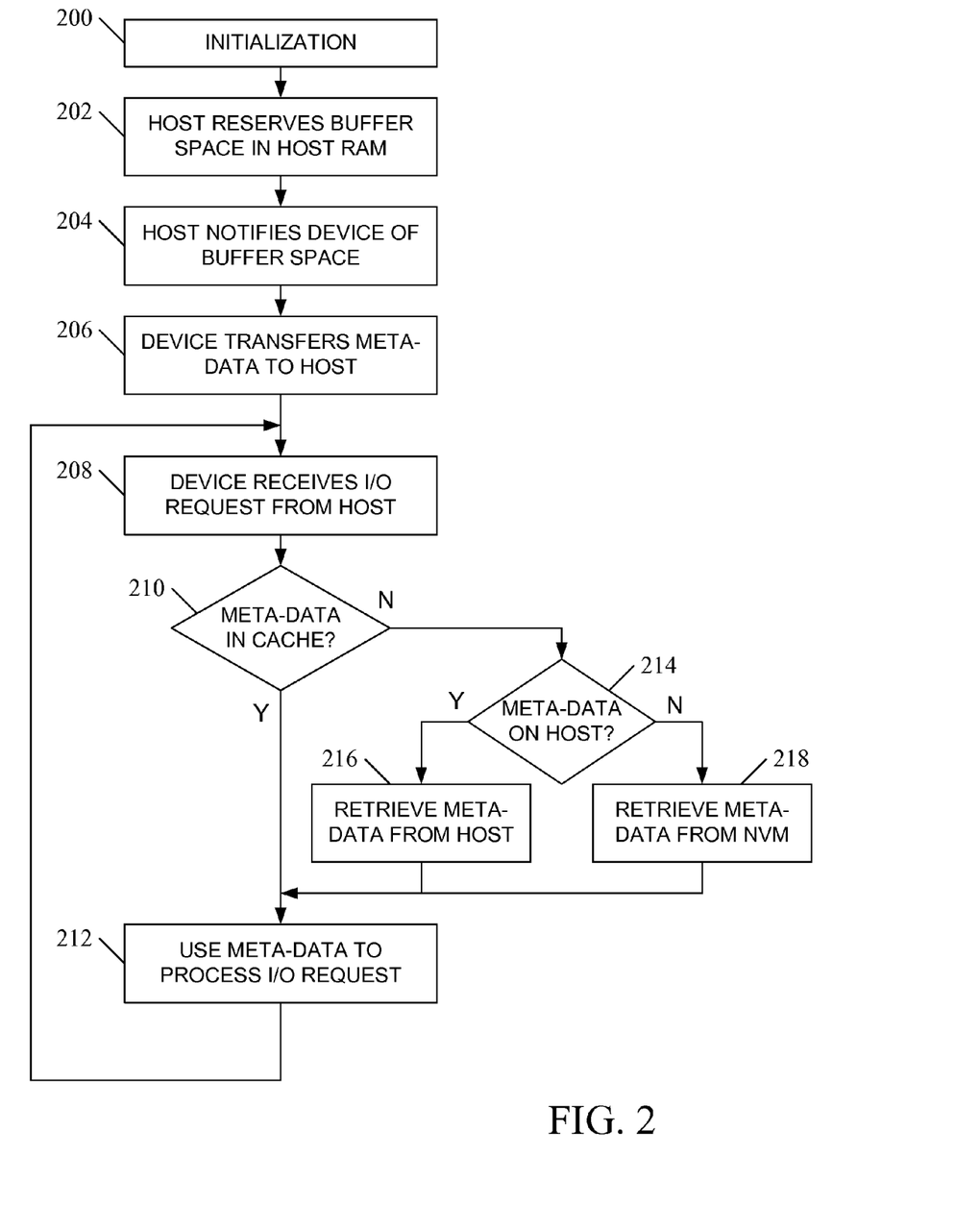
FIG. 2 is a flow chart illustrating an exemplary process for solid state drive caching across a host bus according to an embodiment of the subject matter described herein.

FIG. 2 is a flow chart illustrating an exemplary process for solid state drive caching across a host bus according to an embodiment of the subject matter described herein. The steps of this process will now be described with reference to FIGS. 1 and 2.

In the embodiment illustrated in FIG. 2, the process starts with an initialization 200 during which a host and/or a device may be initialized. Referring to the embodiment illustrated in FIG. 1, for example, host 102, device 104, or both may execute an initialization routine. For example, initialization may occur when a removable storage device, such as an SSD, is attached to a host, when the host or device is first powered up, in response to a user-driven initialization event such as a reset, or other event. In one embodiment, initialization 200 may include establishing the connection between host 102 and device 104 over host bus 106.

At step 202, the host reserves buffer space in host RAM. In the embodiment illustrated in FIG. 1, for example, host 102 may set aside a portion of RAM 110 for use as a host cache 112. It should be noted that host 102 may allocate actual RAM space for host cache 112, but that host 102 may also implement some form of memory management in which relatively rarely used data may be cached to a host mass storage device, such as a hard disk drive (HDD), SSD, or other form of secondary storage. Thus, host cache 112 may be subject to memory management policies on host 102 and as a result be moved to some other location, with the understanding that when access to host cache 112 is required, that data would be restored back to host RAM 110 prior to use.

At step 204, the host notifies the device of the available buffer space. In the embodiment illustrated in FIG. 1, for example, host 102 may send a notification to device 104 indicating that host cache 112 is available for use by device 104, along with other information that may be needed by device 104, such as the address or location of host cache 112 within RAM 110, etc.

At step 206, the device may transfer metadata to the host. This step may be executed at any point after step 204. Step 206 may also occur multiple times as needed, and may occur as a result of a variety of trigger conditions. For example, step 206 may occur immediately after device 104 is notified of the availability of host cache 112, or it may not occur until device cache 118 has run out of space and host cache 112 is needed as overflow capacity.

In one embodiment, device 104 may transfer to host cache 112 all of the metadata currently maintained by device 104. This is useful when it is faster for device 104 to retrieve metadata from host 102 via host bus 106 than it is for device 104 to retrieve metadata from its own NVM 116. This is also useful when device cache 118 capacity is very limited.

In an alternative embodiment, device 104 may transfer just a subset of metadata to host cache 112. As stated above, device 104 may be configured to transfer only certain kinds of metadata to host cache 112.

At step 208, device receives an I/O request from the host. In the embodiment illustrated in FIG. 1, for example, device 104 may receive a read, write, or other I/O request from host 102.

At step 210, the device determines whether the metadata needed to process or fulfill the received I/O request is currently stored on the device cache. In the embodiment illustrated in FIG. 1, for example, device 104 may attempt to read the needed information from device cache 124. If the needed metadata is found in device cache 124, the process goes to step 212.

At step 212, the metadata is used to process the I/O request. The system then waits for the next I/O request, at which time the process will return to step 208, repeating as needed.

If, at step 210, the needed metadata is not currently found on the device, the process moves to step 214, which checks for the presence of the needed metadata within the host cache 112. If the metadata exists within host cache 112, the data is retrieved from the host (step 216) and used (step 212.) If, at step 214, the metadata does not exist on the host, the data is retrieved from the non-volatile memory (step 218) and used (step 212.)

In this manner, a host may collaborate with a device to maximize the efficiency of the device by allowing the device to cache some of the device metadata across the host bus, thus avoiding expensive metadata accesses from the non-volatile storage.

Figure 3:
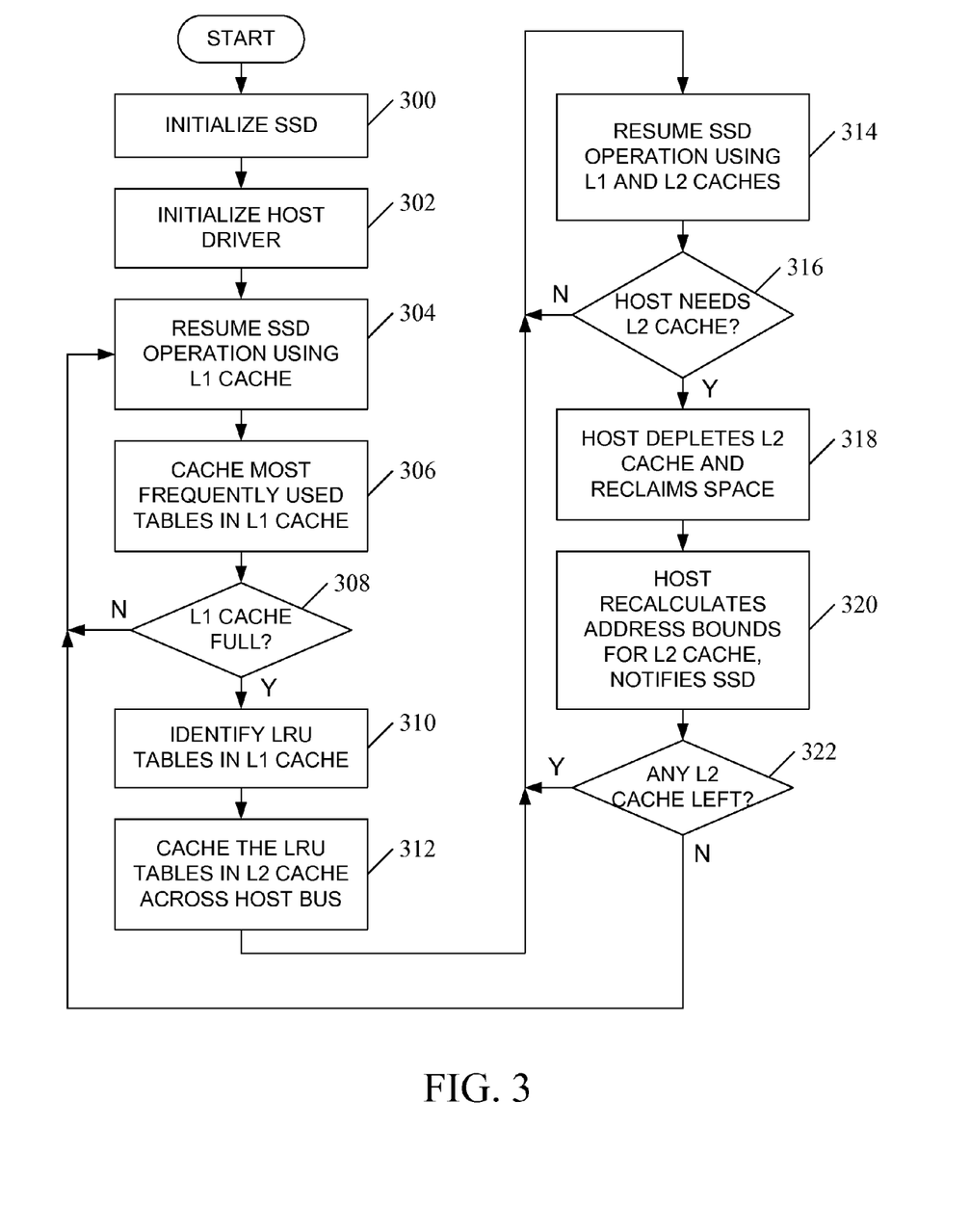
FIG. 3 is a flow chart illustrating an exemplary process for solid state drive caching across a host bus according to another embodiment of the subject matter described herein.

FIG. 3 is a flow chart illustrating an exemplary process for solid state drive caching across a host bus according to another embodiment of the subject matter described herein. In the embodiment illustrated in FIG. 3, the interaction is between a host and an SSD, but the same principles may be applied to an interaction between other types of devices.

In the embodiment illustrated in FIG. 3, the process starts by initializing the SSD (step 300.) In one embodiment, this may include initializing SSD control tables or other metadata and initializing the L1 cache. Referring to FIG. 1, for example, controller 120 may clear device cache 118 and set up control table(s) 124.

At step 302, the host driver is initialized. In one embodiment, this may include setting aside a portion of the host memory for use as a host cache, optionally clearing that memory, and sending the address for that portion to the SSD. Referring to FIG. 1, for example, host CPU 108 may reserve a portion of RAM 110 for use as a host cache 112 and send to device 104 information that device 104 needs to access host cache 112, e.g., the logical address range that host cache 112 occupies in host RAM 110. In one embodiment, unless the host needs to reclaim some or all of that memory space (described in more detail below), the space occupied by host cache 112 is locked for exclusive use by device 104 between device power up and power down.

At step 304, operation of the SSD starts or resumes using the L1 cache. At step 306 the most frequently used tables are cached in the L1 cache. Referring to FIG. 1, for example, controller 120 on device 104 may store the most recently used metadata in control table(s) 124 within device cache 118 (e.g., on-board SRAM.) In this embodiment, metadata is not moved into L2 cache right away, but instead is moved into L2 cache only when there is a need to do so.

If, at step 308, it is determined that the L1 cache is not full, the process returns to step 304, in which the SSD resumes operation using the L1 cache. If, at step 308, it is determined that the L1 cache is full, the least recently used (LRU) tables in L1 cache are identified (step 310) and cached into L2 cache across the host bus (step 312.) The SSD then resumes operation using both L1 and L2 caches (step 314.) Referring to FIG. 1, for example, controller 120 on device 104 may determine that device cache 118 cannot store any more control tables 124 and therefore identifies the least recently used table or tables and transfers them into host cache 112 via host bus 106.

At step 314, the SSD operates using L1 and L2 caches. Referring to FIG. 1, for example, in one embodiment, once device 104 learns about the buffer address in host RAM 110, device 104 may transfer all or partial control data tables 124 to the host cache 112 (becoming control tables 114.) During read operations from device 104, address translation is performed using control tables 124 stored on device cache 118 as well as control tables 114 stored in host cache 112. In one embodiment, control data that is most used is retained in device cache 118 and less recently used control data is either flushed to host cache 112 or, if it already exists in host cache 112, removed from device cache 118 completely. This fetch of control data 114 from host cache 112 is very fast and avoids bottleneck on local (flash) bus 122.

If and when host 102 needs to reclaim cache space allocated for use by the device (e.g., host cache 112), host 102 can temporarily deplete the cache space. Doing so only reduces the performance of device 104 temporarily without introducing any data integrity issues given the nature of the data that is stored in the cache. The flowchart below details the method.

In the embodiment illustrated in FIG. 3, the host has the option to reclaim the memory space that it had previously allocated for use as host cache 112. Thus, at step 316, it is determined whether the host needs some or all of the L2 cache. If not, the process returns to step 314, where the SSD resumes operation using L1 and L2 caches. If the host does need that memory space, however, the process goes to step 318, in which the host depletes the L2 cache and reclaims that memory space. Referring to FIG. 1, for example, host 102 may reclaim some or all of the space in RAM 110 currently used by host cache 112. In one embodiment, host 102 may notify device 104 of its intent to reclaim that space and transfer the control tables 114 back to device 104 over host bus 106 or give device 104 the opportunity to retrieve control tables 114 by its own request. In another embodiment, however, host 102 may simply reclaim host cache 112 without warning, in which case any information stored within host cache 112 is lost.

At step 320, the host recalculates the address bounds for the L2 cache and notifies the SSD of the change. The host may decide to reclaim some of the L2 cache or all of the L2 cache. Thus, at step 322, if the host has reclaimed all of the L2 cache space, then there is not any L2 cache left for use by the SSD, and the process returns to step 304, where the SSD resumes operation using only L1 cache. If, at step 322, the host has left some L2 cache for the SSD to continue to use, the process returns instead to step 314, where the SSD resumes operation using its L1 cache and whatever L2 cache is available.

In one embodiment, host bus 106 uses a protocol that allows device 104 to be the bus master. In this embodiment, device 104 does not need to use a host bus adapter to communicate with host RAM 110; this allows device 104 to directly read and write host cache 112 memory space transparently.

In one embodiment, host side software should allocate the memory needed for host (L2) cache 112, notify device 104 how to access that memory, and release that memory to support device (L1) cache 118 extension. This might require a specific host application to be spawned or a third party driver installation on host system. Conventional methods for allocating and releasing memory may be used and will not be described in detail here.

Figure 4:
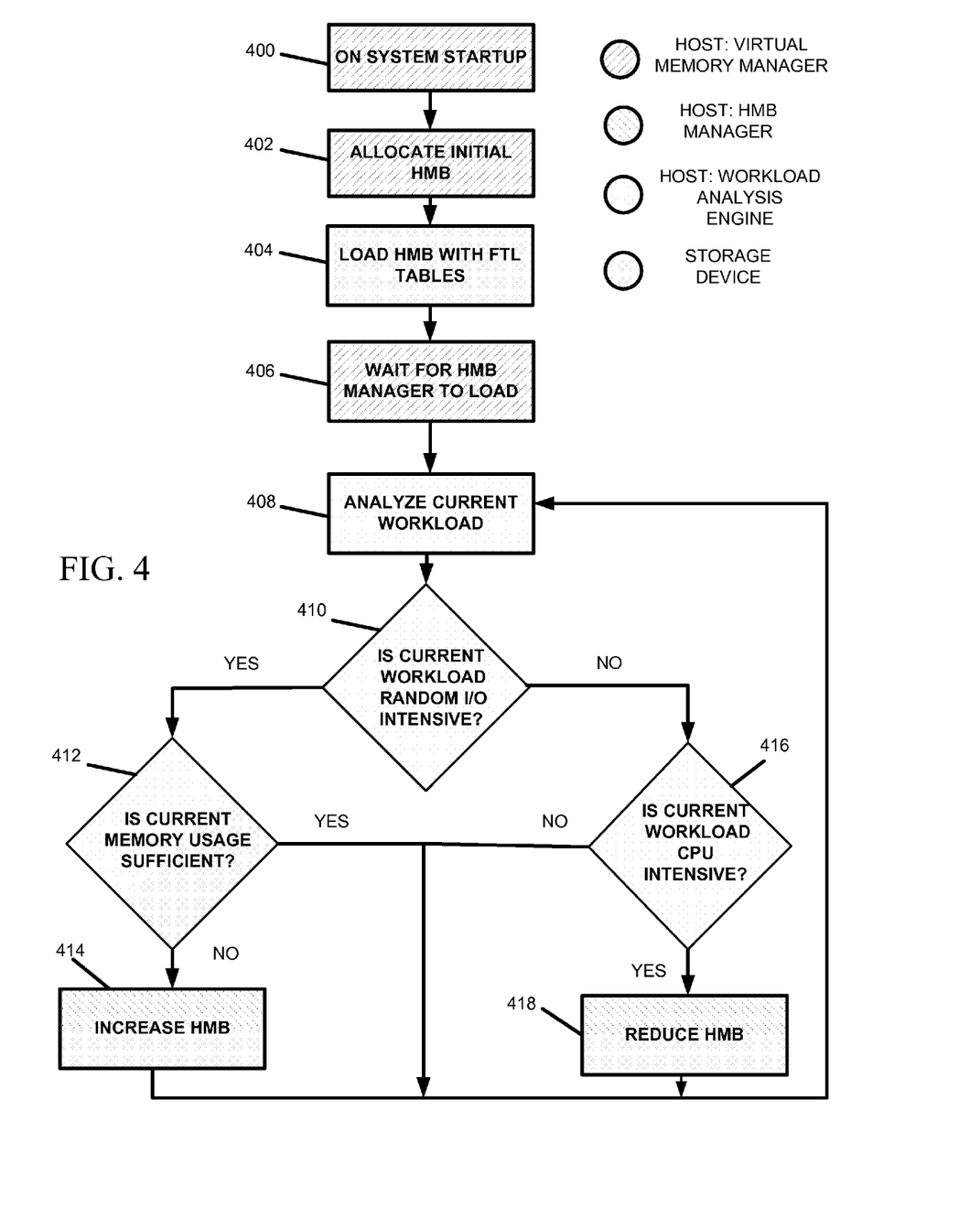
FIG. 4 is a flow chart illustrating an exemplary process for providing a flexible host memory buffer according to an embodiment of the subject matter described herein.

FIG. 4 illustrates an exemplary process implemented by workload analyzer 140 and HMB manager 142 for managing a size of host cache or memory buffer 112. Referring to FIG. 4, in steps 400 and 402, on system startup, the host cache or memory buffer 112 is initialized. Initializing host cache or memory buffer 112 may include allocating an initial amount of RAM 110 for host cache or memory buffer 112. In step 404, the storage device loads host cache or memory buffer 112 with FTL tables and/or associated metadata. In step 404, the process waits for HMB manager 142 to load.

In steps 406 and 408, workload analyzer 140 analyzes the current workload on host cache 112. Analyzing the current workload on host cache 112 may include monitoring reads and writes to the memory address range corresponding to host cache 112, determining whether the access pattern is random or sequential, and monitoring the frequency of access to cache 112 relative to other CPU operations. In step 410, it is determined if the current workload is random I/O intensive. A random I/O intensive workload indicates random accesses to host cache 112, which may be indicative of accesses to FTL tables. If the work is random I/O intensive, control proceeds to step 412 where it is determined whether the current usage or size of host cache or memory buffer 112 is sufficient. Determining whether the current memory usage or size is sufficient may include determining a ratio of swaps to and from storage device 104 to host reads. If the ratio of swaps to host reads is high, accesses to host cache or memory buffer 112 may be a performance bottleneck, and the current size of host cache or memory buffer 112 may be determined to be insufficient. If the current size of host cache or memory buffer 112 is determined to be insufficient, control proceeds to step 414 where workload analyzer 140 instructs HMB manager 142 to increase the size of host cache or memory buffer 112.

Returning to step 412, if the current usage or size of host memory buffer or cache 112 is determined to be sufficient, the current size is maintained, and control returns to step 408 where the current workload is analyzed. The analysis of the current workload may be performed at fixed intervals or continually.

Returning to step 410, if the current workload is not random I/O intensive, i.e., the current workload is primarily sequential accesses to host cache 112, control proceeds to step 416 where it is determined whether the current workload is CPU intensive. If the current workload is determined to be CPU intensive, this means that the CPU is accessing host cache or memory buffer 112 during one or more cycles and then spending subsequent cycles processing data read from host cache or memory buffer 112. If this is true, host cache or memory buffer 112 may be under-utilized. Accordingly, in step 418, workload analyzer 140 instructs HMB manager 142 to reduce the size host cache or memory buffer 112. Control then returns to step 408 where the current workload on host cache 112 is re-analyzed. Returning to step 416, if the current workload is not CPU intensive, i.e., if the ratio of sequential reads to host cache 112 CPU processing cycles is near one to one, this indicates that an access to host cache 112 is being performed during nearly every CPU cycle. If this is true, it may not be desirable to reduce the size of host cache or memory buffer 112. Accordingly, the size of host cache or memory buffer 112 is maintained at its current level and control returns to step 408 where the current workload is re-analyzed. Thus, using the steps illustrated in FIG. 4, the size of host cache or memory buffer 112 may be dynamically and continually updated based on CPU utilization and access to host cache or memory buffer 112.

Caching Algorithm.

As detailed in FIG. 3 above, in one embodiment, host cache 112 is used as an L2 cache, e.g., where the least recently used (LRU) control data that overflows from the L1 cache is identified and cached across a host bus into host cache and where the SSD accesses its control tables from both the L1 and L2 caches. Referring to FIG. 1, for example, most recently used (MRU) tables may first be cached in L1 cache 118 and the overflow is cached in L2 cache across 112 via host bus 106. When host 102 wishes to reclaim some L2 cache 112 space, the host driver that allocates L2 space informs device 104 of the modified L2 address space bounds. During write operations, if entries in control table 114 or 124 become dirty, such entries will be coalesced and flushed to non-volatile memory 116.

NVMe Example

There are a number of ways by which host 102 may notify device 104 of the presence and size of host cache 112. One method makes use of features provided in the NVMe protocol. The non-volatile memory (NVM) host controller interface (NVMHCI) specification, also known as NVM express or "NVMe", is a specification for accessing solid state drives attached through the peripheral component internet (PCI) express bus, also known as "PCIe". The NVMe protocol allows up to 64K command queues, each of which can hold up to 64K read/write commands. The read/write commands in a queue are assigned to buffers in the host address space (i.e., RAM), which the SSD then pushes data into or pulls data out of respectively. In one embodiment, host cache 112 could be reserved by creating an NVMe queue consisting of dummy commands that would request host address buffer space and lock it indefinitely. This creating of dummy queue can be accomplished by a third party driver or a host application. Upon acquiring the additional host side buffer space, its address is passed down to the device. Storage device 104 can then access these buffer spaces, which make up host cache 112. In an alternate embodiment, the dummy queue can be omitted, and host drivers can allocated space in host cache 112 directly using wired/non-paged memory and pass the location to storage device 104 using the NVMe protocol's provisions for such allocation.

Figure 5:
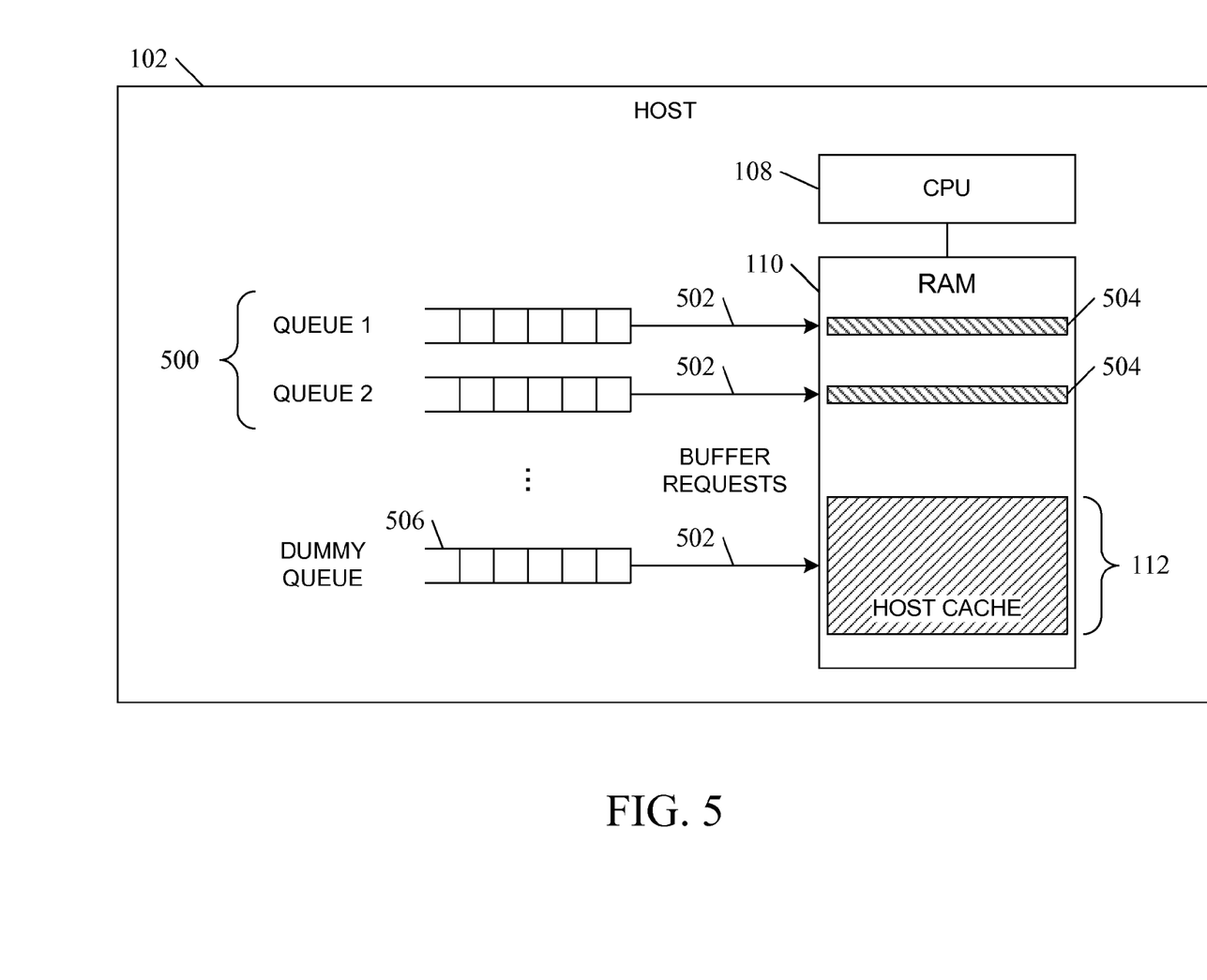
FIG. 5 is a block diagram illustrating an exemplary use of a dummy NVMe queue to reserve buffer space for a host cache within a host RAM according to another embodiment of the subject matter described herein

FIG. 5 is a block diagram illustrating an exemplary use of a dummy NVMe queue to reserve buffer space for a host cache within a host RAM according to another embodiment of the subject matter described herein. In the embodiment illustrated in FIG. 5, in addition to normal NVMe queues 500 1 and 2, which make buffer requests 502 that result in the reservation of buffer space 504 in RAM 110, host 102 includes a dummy queue 506, which also makes buffer requests 502 that result in the creation of host cache 112.

In one embodiment, the data that is stored by device 104 across host bus 106 into host cache 112 may be selected such that the operation of device 104 can continue even if that data is lost, deleted by host 102, or otherwise unavailable to device 104. In one embodiment, host cache 112 can be used by device 104 to store data that can be reconstructed from NVM 116 even after a power cycle. Such data includes, but is not limited to: control tables for flash management that are always backed up, such as mapping data and other metadata; device configuration data that is loaded at boot time from NVM 116 and never modified; garbage collection data for which the sources are available on device 104; and even cached read data.

The subject matter described herein is not limited to using the NVMe protocol to allow host cache 112 to be used to cache data for a storage device 104. Any suitable protocol is capable of allocating cache space on host 102 and making that space available to a connected storage device 104 is intended to be within the scope of the subject matter described herein.

According to another aspect of the subject matter described herein, where the PCIe protocol is used on the host bus, the channel splitting functionality of the PCIe protocol can be used to implement host caching of data for a connected storage device 104. Conventionally, the PCIe protocol is used to maintain QoS on the host bus. According to an aspect of the subject matter described herein, the high priority virtual channel on the PCIe bus may be used to transfer metadata to and from storage device 104 and the lower priority virtual channel can be used to transfer data to and from storage device 104.

The subject matter described herein has the additional advantage that the same design can be used for both high-end and low-end designs: when cache memory size needs to be increased with the increase in device capacity, extra tables may be saved to host memory. This can reduce the cost of the product, improve power savings, and improve the balance the host vs. flash bandwidth.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing a flexible host memory buffer, the method comprising:
    allocating an amount of host memory as a host memory buffer accessible by a solid state drive (SSD) as a cache for SSD data;
    caching data from the solid state drive in the host memory buffer;
    monitoring utilization of the host memory buffer, wherein monitoring utilization of the host memory buffer includes determining a ratio of swaps between the host memory buffer and the SSD to host reads of data stored on the SSD; and
    dynamically increasing or decreasing the amount of host memory allocated for the host memory buffer based on the utilization, wherein dynamically increasing or decreasing the amount of host memory allocated for the host memory buffer includes increasing the amount of host memory allocated for the host memory buffer if the ratio indicates that accesses to the host memory buffer are a performance bottleneck.

2. The method of claim 1 wherein allocating the amount of host memory for use as the host memory buffer includes performing an initial allocation of host memory space at startup of a host computing system.

3. The method of claim 1 wherein caching data from the SSD in the host memory buffer includes caching flash translation layer (FTL) tables in the host memory buffer.

4. The method of claim 3 wherein monitoring utilization of the host memory buffer includes determining whether a current workload on the host memory buffer includes swaps of the FTL tables.

5. The method of claim 4 comprising, in response to determining that the workload includes swaps of the FTL tables, determining whether a current size of the host memory buffer is sufficient.

6. The method of claim 5 wherein determining whether a current size of the host memory buffer is sufficient includes determining whether a ratio of swaps between SSD memory and the host memory buffer and host reads has a predetermined relationship with respect to a threshold.

7. The method of claim 5 comprising, in response to determining that the current size of the host memory buffer is not sufficient, dynamically increasing the size of the host memory buffer.

8. The method of claim 4 comprising, in response to determining that the workload does not include swaps of the FTL tables, determining whether the current workload relating to accesses to the host memory buffer is CPU intensive.

9. The method of claim 8 wherein determining whether the current workload is CPU intensive includes determining whether a ratio of CPU cycles to CPU cycles relating to accesses to the host memory buffer has a predetermined relationship with respect to a threshold.

10. The method of claim 8 comprising, in response to determining that the workload is CPU intensive, dynamically reducing the amount of host memory allocated for the host memory buffer.

11. A system for providing a flexible host memory buffer, the system comprising:
    a solid state drive (SSD);
    a host memory including a host memory buffer accessible by the solid state drive as a cache for SSD data, wherein the solid state drive is configured to cache data from the solid state drive in the host memory buffer;
    a workload analyzer for monitoring utilization of the host memory buffer, wherein monitoring utilization of the host memory buffer includes determining a ratio of swaps between the host memory buffer and the SSD to host reads of data stored on the SSD; and
    a host memory buffer manager for dynamically increasing or decreasing the amount of host memory allocated for the host memory buffer based on the utilization, wherein dynamically increasing or decreasing the amount of host memory allocated for the host memory buffer includes increasing the amount of host memory allocated for the host memory buffer if the ratio indicates that accesses to the host memory buffer are a performance bottleneck.

12. The system of claim 11 wherein the SSD is configured to cache flash translation layer (FTL) tables in the host memory buffer.

13. The system of claim 12 wherein the workload analyzer is configured to determine whether a current workload on the host memory buffer includes swaps of the FTL tables.

14. The system of claim 13 wherein, in response to determining that the workload includes swaps of the FTL tables, the workload analyzer is configured to determine whether a current size of the host memory buffer is sufficient.

15. The system of claim 14 wherein the workload analyzer is configured to determine whether the current workload is random I/O intensive based on whether a ratio of swaps between SSD memory and the host memory buffer and host reads has a predetermined relationship with respect to a threshold.

16. The system of claim 14 wherein, in response to determining that the current size of the host memory buffer is not sufficient, the host memory buffer manager is configured to dynamically increase the size of the host memory buffer.

17. The system of claim 13 wherein, in response to determining that the workload does not include swaps of the FTL tables, the workload analyzer is configured to determine whether the current workload relating to accesses to the host memory buffer is CPU intensive.

18. The system of claim 17 wherein the workload analyzer is configured to determine whether the current workload is CPU intensive based on whether a ratio of CPU cycles to CPU cycles relating to accesses to the host memory buffer has a predetermined relationship with respect to a threshold.

19. The system of claim 17 wherein, in response to a determination that the workload is CPU intensive, the host memory buffer manager is configured to reduce the amount of host memory allocated for the host memory buffer.

20. A non-transitory computer readable medium having stored thereon executable instructions that when accessed by the processor a computer control the computer to perform steps comprising:
   allocating an amount of host memory as a host memory buffer accessible by a solid state drive (SSD) as a cache for SSD data;
   caching data from the solid state drive in the host memory buffer;
   monitoring utilization of the host memory buffer, wherein monitoring utilization of the host memory buffer includes determining a ratio of swaps between the host memory buffer and the SSD to host reads of data stored on the SSD; and
   dynamically increasing or decreasing the amount of host memory allocated for the host memory buffer based on the utilization, wherein dynamically increasing or decreasing the amount of host memory allocated for the host memory buffer includes increasing the amount of host memory allocated for the host memory buffer if the ratio indicates that accesses to the host memory buffer are a performance bottleneck.

21. A method for allocating and reclaiming space for a host cache, the method comprising:
   allocating an initial amount of host memory space for use as a host cache accessible by a solid state drive (SSD);
   determining whether the host needs some or all of the space allocated for the host cache;
   in response to determining that the host needs some or all of the memory space allocated for the host cache, reclaiming, by the host system, at least some of the memory space allocated for the host cache;
   monitoring, by the host system, utilization of the host cache, wherein monitoring utilization of the host cache includes determining a ratio of swaps between the host memory buffer and the SSD to host reads of data stored on the SSD; and
   dynamically increasing or decreasing the amount of host memory allocated for the host cache based on the utilization, wherein dynamically increasing or decreasing the amount of host memory allocated for the host cache includes increasing the amount of host memory allocated for the host cache if the ratio indicates that accesses to the host cache are a performance bottleneck.

* * * * *